May 11, 1943.　　　J. K. McLEOD　　　2,319,010
COLLISION ALARM
Filed Oct. 25, 1941
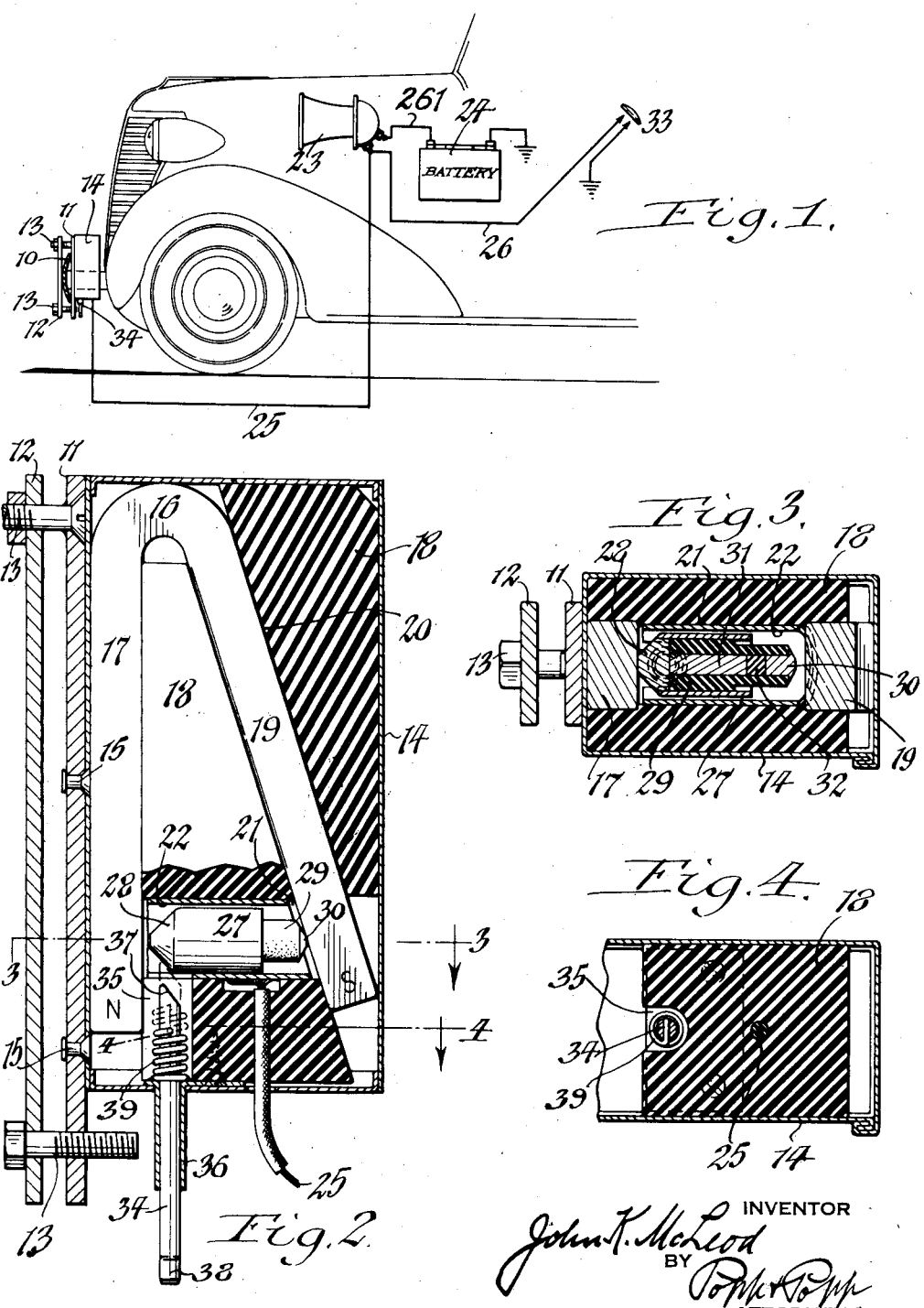
INVENTOR
John K. McLeod
BY
ATTORNEYS Patented May 11, 1943

2,319,010

UNITED STATES PATENT OFFICE 2,319,010

COLLISION ALARM

John K. McLeod, Buffalo, N. Y.

Application October 25, 1941, Serial No. 416,549

7 Claims. (Cl. 200—52)

This invention relates to a circuit closer which is more particularly intended for use on an automobile for indicating that the same has come in contact with another car or object and thus serve as an alarm to attract attention so that any desired action may be taken as the result of such collision.

As is well known an automobile is often bumped and damaged by another car while the latter is being parked and frequently the party responsible for the damage disappears before he can be apprehended and account or adjust for the damage.

It is the object of this invention to provide a circuit closer of simple, efficient and inexpensive construction whereby an alarm, preferably of the audible type, will be given automatically whenever one car strikes or contacts another car and continue to sound or maintain said alarm until manually stopped and thereby attract the attention of persons nearby and thus aid in fixing the responsibility for the accident and enabling the injured party to recover for any damages which have been sustained.

In the accompanying drawing:

Fig. 1 is a diagrammatic view showing this invention installed on the front bumper of an automobile and electrically connected with the usual horn, storage battery and horn switch of the car.

Fig. 2 is a vertical longitudinal section, on an enlarged scale, of the circuit closer detached from the car.

Figs. 3 and 4 are horizontal sections, taken respectively on lines 3—3 and 4—4, Fig. 2.

In the following description similar reference characters indicate like parts in the several figures of the drawing:

Although this circuit closer may be mounted on any suitable part of a movable object which is to be protected, the same is shown in the present case on the front metal bumper 10 of an automobile so that when the same is contacted by another car backing into the same, or the car bearing the alarm rams another car an alarm or signal will be sounded and thereby direct attention to the trouble so that the party at fault detected and the injury, if any, adjusted.

The clamping device for securing this alarm to the front bumper which is shown in the drawing is simple and practical and consists of a rear metal upright clamping bar 11 engaging the rear side of the front bumper and carrying the alarm circuit closer and a front metal upright clamping bar 12 engaging the front side of the front bumper and connected at its upper and lower ends by bolts 13 with the corresponding ends of the rear clamping bar.

The numeral 14 represents an enclosing casing preferably constructed of non-magnetic sheet metal, such as brass and having its front wall connected with the rear clamping bar by rivets 15, as shown in Fig. 2, or by any other suitable means. Within this casing is arranged a magnet 16 preferably of the permanent type and having the shape of an inverted letter V. This magnet has its front leg 17 arranged vertically between the front wall of the casing and the front part of an electric insulating block 18 arranged within the casing and practically filling the space therein. The rear leg 19 of the magnet inclines downwardly and rearwardly from the upper end of the front leg and is arranged in a correspondingly inclined opening 20 in the insulating block. When thus arranged the north and south poles of the permanent magnet are located along the front and rear walls of the casing adjacent to the bottom of the latter.

Within the lower part of the insulating block and between the legs of the magnet a horizontal recess 21 is formed which recess contains a longitudinal guide tube 22 of brass or other non-magnetic material. This guide tube forms one terminal or part of an electrical signal circuit while the front leg 17 of the magnet forms the other terminal of this circuit. The front leg 17 of the magnet is grounded on the metallic frame of the car by reason of the magnet and the casing being connected with the front bumper and the guide tube and thus included in the signal circuit which contains the electrical signal horn 23 and a storage battery 24. One side of this horn is connected by a wire or line 25 with the guide tube 22 while the other side of the horn is connected by a wire 26' with one pole of the battery and the other pole of the same is grounded on the frame of the car.

The horn may be the same as that already installed on the car and which may be sounded by means of the usual hand switch 33 one contact of which is connected by a circuit wire 26 with the circuit containing the horn and the battery, and the other side of this hand switch being grounded whereby the electric circuit including the horn and battery is manually controlled for giving the usual traffic signals.

Within the guide tube is arranged a longitudinally reciprocable armature which cooperates with the legs of the permanent magnet and which is constructed to form part of an electrical switch whereby the circuit of the horn through the alarm device will be held open during normal conditions but which will close this circuit when the car is jarred by a bump and cause the horn to be sounded and also hold this circuit closed so that the horn will continue sounding until the circuit of the same is broken manually.

For this purpose the armature and the setting means are constructed as follows:

The numeral 27 represents a cylindrical sleeve of metal, preferably of brass or other non-magnetic material, which is adapted to slide in the metal tube 22 and form electric contact therewith. The front end or pole 28 of the armature has the form of a forwardly tapering head which is made of ferrous metal, such as steel or iron, and secured to the inner side of the sleeve so as to form electric contact therewith. This end or pole is adapted to be engaged with and disengaged from the inner side of the front leg 17 of the magnet. Within the rear part of the armature sleeve is arranged a tubular lining 29 of insulating material, such as hard rubber, and in the rear part of this lining is mounted the rear end or pole 30 of the armature which is also made of ferrous metal, such as steel or iron, and in the form of a rearwardly tapering head. This rear pole of the armature is adapted to be engaged with and disengaged from the inner side of the rear magnet leg 19. For the purpose of increasing the weight of the armature a section or filling 31 of lead is placed within the central part of the lining 29 but insulated from the rear pole 30 by a plug 32 of rubber or the like so as to avoid an electrical connection between the front and rear poles of the armature.

When setting this device so that the same is ready for use the armature is pushed backwardly so that the rear end or pole of the same engages the rear leg of the magnet which latter holds the armature in this position by magnetic attraction. While the armature is in this position the front end or pole is out of engagement from the front leg of the magnet and as this front armature pole 28, the armature sleeve 27 and guide tube 22 are only electrically connected by the wire 25 with one side of the horn, these parts in effect operate as a switch which at this time opens the circuit containing the horn so that the latter is not sounded.

When, however, any part of the car is bumped or jarred sufficiently in a direction to cause the magnet and associated parts to move rearwardly suddenly, then the inertia of the armature will cause the rear leg of the magnet to be drawn away from the rear end of the armature and the front end of the same to be engaged by the front leg of the magnet. The instant this occurs the circuit containing the horn and battery will be closed across the front leg of the magnet and the front end of the armature engaging therewith so as to operate as an electric switch whereby the horn will be sounded and give an alarm that the car has been jolted or bumped in some way. When the front end of the armature engages the front leg of the magnet the same will be held in this position by magnetic attraction and thus maintain the alarm in action for the purpose of attracting attention to such an occurrence and lead to the possible detection of the offending party and an adjustment for any damage which may have been sustained.

Whenever it is desired to stop the sounding of the horn the electric circuit containing the same is broken by moving the armature rearwardly out of engagement from the front leg of the magnet and into engagement with the rear leg of the same where it will be held by magnetic attraction preparatory to giving an alarm whenever the car is again bumped as above described.

Various means may be employed for resetting the armature in a position in which the circuit of the alarm is open preparatory to being again closed, but those shown in the drawing have been satisfactory in actual practice and are constructed as follows:

The numeral 34 represents a vertically movable shifting rod which has its upper part arranged in a notch 35 in the lower front part of the insulating block 18 and its lower part sliding in a vertical guideway 36 projecting downwardly from the bottom of the casing. At its upper end the shifting rod is provided with a wedge or cam 37 which is adapted to engage with the tapering front end of the armature for moving the same backwardly out of engagement from the front leg of the magnet and into engagement with the rear leg of the same.

This shifting rod is adapted to be raised manually by means of a handle or fingerpiece 38 arranged on the lower end of the same, and when this rod is free the same is drawn downwardly so that its wedge is out of engagement with the armature by means of a spring 39 surrounding the shifting rod within the casing and connected at its upper end with this rod while its lower end is connected with the bottom of the casing.

Normally the shifting rod is yieldingly held in its depressed position by the spring 39 so that the wedge 37 is arranged below the path of the armature, as shown by full lines in Fig. 2, but when it is desired to retract the armature for opening the alarm circuit and stop sounding of the horn the shifting rod is raised so that its wedge engages the front end of the armature, as shown by dotted lines in Fig. 2, and pushes the armature rearwardly out of engagement from the front leg of the magnet and into engagement with the rear leg of the same.

In addition to sounding the alarm for aiding in apprehending parties who may have injured a car by colliding with the same, this alarm also serves as a warning to parties who may have only moderately bumped a car and thus serves to prevent or at least moderate the injury which otherwise might possibly occur under the circumstances.

While the parts are in the position shown in Fig. 2, in which the electric circuit of the alarm device is open, it is possible to temporarily close this circuit and briefly sound the alarm by raising the rod 34 sufficiently to touch the periphery of the armature, thereby enabling the owner of the car or an officer authorized to inspect such apparatus to readily test the operativeness of the same independently of the electric contacts 17, 22 and thus insure maintaining the apparatus in condition to give an alarm under the circumstances above mentioned.

As a whole this device is very simple in construction and can be readily installed on various available places on a car, particularly on the front and rear bumpers. Moreover, the same is effective in its operation and the same is not liable to get out of order inasmuch as the same has no delicate parts which are exposed to the weather.

It will be noted that the armature is not attached to any stationary part and therefore free to float between the poles of the permanent magnet for opening and closing the electric circuit.

I claim as my invention:

1. An electric switch comprising a magnet having two poles, a free floating armature movable between said poles and not attached to any stationary part and adapted to alternately engage its opposite ends respectively with said poles, and electric switch contacts which are adapted to form part of an electric circuit and which are engaged and disengaged as said armature moves between said pole said armature being constructed and mounted to cause the same to move from one of said poles to the other by its momentum when subjected to a jarring action.

2. An electric switch comprising a magnet having two poles, a free floating armature movable between said poles and not attached to any stationary part and adapted to alternately engage its opposite ends respectively with said poles, electric switch contacts which are adapted to form part of an electric circuit and are engaged for closing said circuit when the armature engages one of said poles and manually operated shifting means for disengaging said armature from one of said poles and moving the same toward the other pole said armature being constructed and mounted to cause the same to move from one of said poles to the other by its momentum when subjected to a jarring action.

3. An electric switch comprising a magnet having two poles, a free floating armature movable between said poles and not attached to any stationary part and adapted to alternately engage its opposite ends respectively with said poles, electric switch contacts which are adapted to form part of an electric circuit and which are engaged and disengaged as said armature moves between said poles, and manually operated means for controlling said circuit independently of said contacts said armature being constructed and mounted to cause the same to move from one of said poles to the other by its momentum when subjected to a jarring action.

4. An electric switch comprising a magnet having two poles, one of which forms a switch contact adapted to be included in an electric circuit, an armature movable between said poles and having its opposite ends adapted to engage alternately with the poles of said magnet and one end of the armature forming a switch contact adapted to be included in said electric circuit and the ends of said armature being electrically insulated from each other, and a relatively stationary contact included in said electric circuit and engaged by the periphery of said armature contact.

5. An electric switch comprising a magnet having two poles, one of which forms a switch contact adapted to be included in an electric circuit, an armature movable between said poles and having its opposite ends adapted to engage alternately with the poles of said magnet and one end of the armature forming a switch contact adapted to be included in said electric circuit and the ends of said armature being electrically insulated from each other, and a stationary tubular contact included in said circuit and engaged by the periphery of said armature and forming a guide therefor.

6. An electric switch comprising a magnet having two poles, one of which forms a switch contact adapted to be included in an electric circuit, an armature movable between said poles and having its opposite ends adapted to engage alternately with the poles of said magnet and one end of the armature forming a switch contact adapted to be included in said electric circuit and the ends of said armature being electrically insulated from each other, a metal tube enclosing the ends of said armature and the insulation between the same, and a stationary metal tube in which said armature slides and which contacts with the tube of said armature and is included in said electric circuit.

7. An electric switch comprising a magnet having two poles, an armature movable between said poles and adapted to be attracted at its opposite ends by said poles, switch contacts which are adapted to be engaged and disengaged by the movement of said armature and which are included in an electric circuit, a manually operated shifting rod adapted to wedgingly engage said armature for disengaging the same from the respective pole, and spring means for yieldingly holding said rod in an inoperative position.

JOHN K. McLEOD.